United States Patent [19]

Olashaw

[11] 3,764,765

[45] Oct. 9, 1973

[54] HEAT DISSIPATION MEANS FOR ELECTRIC DEVICES MOUNTED IN SWITCHBOARDS (ESPECIALLY CIRCUIT BREAKERS)

[75] Inventor: William Francis Olashaw, Plainville, Conn.

[73] Assignee: General Electric Company, New York, N.Y.

[22] Filed: June 12, 1972

[21] Appl. No.: 261,595

[52] U.S. Cl. ........ 200/166 K, 317/120, 174/15 BH, 165/105

[51] Int. Cl. ........ H01h 9/52

[58] Field of Search ........ 317/100, 120; 200/166 K; 165/105; 174/15 R, 15 BH

[56] References Cited

UNITED STATES PATENTS

| | | | |
|---|---|---|---|
| 3,662,137 | 5/1972 | Cleaveland | 174/15 BH |
| 3,653,433 | 4/1972 | Scharli | 165/105 |
| 2,953,629 | 9/1960 | Lapp | 174/15 BH |
| 3,626,253 | 12/1971 | Sturdwan | 317/120 |
| 3,349,291 | 10/1967 | Olashaw | 317/120 |

*Primary Examiner*—Robert K. Schaefer
*Assistant Examiner*—Gerald P. Tolin
*Attorney*—Robert T. Casey et al.

[57] ABSTRACT

An electric switchboard assembly including a main enclosure formed of sheet metal, and barriers extending parallel to the front wall and dividing the switchboard assembly into at least two vertical sections. The vertical section nearest the front wall of the switchboard assembly contains electrical control devices such as electric switches, fuses, circuit breakers, etc. The remainder of the assembly contains vertically extending power supply bus bars which are connected to the electrical control devices, and load connections, including load bus bars, for connecting the control devices to outgoing conductors leading to power consuming devices. The switchboard assembly also includes heat bleeding and dissipating means of the evaporating and recondensing "heat pipe" type with heat dissipating fins. Connecting means is provided so that when the electrical control devices are in mounted position in the switchboard, a heat conducting connection is formed between the device and the heat pipe cooling means, whereby heat generated in the electrical control device is conducted to the heat dissipating fins and carried away by the natural circulation of air.

6 Claims, 5 Drawing Figures

HEAT DISSIPATION MEANS FOR ELECTRIC DEVICES MOUNTED IN SWITCHBOARDS (ESPECIALLY CIRCUIT BREAKERS)

BACKGROUND OF THE INVENTION

One of the major problems involved in the design of electrical switchboard assemblies relates to the dissipation of heat generated in the assembly such as heat generated in electrical control devices which are mounted in the switchboard assembly and connected to the power supply bus bars, heat generated at the connecting points which connect the control devices to the bus bars, and heat generated in the bus bars themselves by current flowing through them. The most effective available means for disposing of such heat heretofore has been the circulation of air around these parts. Thus switchboards have been designed to include vent openings in the walls at the lower portions, and openings at the upper portion or the top to permit the natural circulation of air vertically through the switchboard. While forced circulation of such air has been used in some instances, this is not a generally acceptable measure because of the cost and space required for ventilating fans and because of the possibility of failure of such fans. The circulation of air, is also limited in its effectiveness because the above-mentioned locations where heat is generated are not such that air can effectively circulate around them, and furthermore, means to enhance the dissipation of heat, such as fins, etc., cannot readily be added to these parts. Also, ventilation in these areas introduces dirt and other foreign substances generally harmful to the operation and/or safety of such devices.

It is another object of the invention to provide a switchboard of the type described which is not significantly more expensive than prior art switchboards without such heat dissipating means.

A further object of the invention is to provide a switchboard of the type described in which connection is made between the electrical control devices and the heat dissipating means simply, effectively, and inexpensively, at the time the device is mounted in the switchboard.

It is a more particular object of the invention to provide an electric switchboard assembly of the type described including means for making a plug-in type connection for transfer of heat from an electrical control device mounted in the switchboard and the heat dissipating means carried by the switchboard.

SUMMARY OF THE INVENTION

In accordance with the invention in one form, an electric switchboard assembly is provided including a generally rectangular main enclosure of sheet metallic material and barrier means extending parallel to the front wall of the enclosure dividing the enclosure into the number of vertically extending chambers. The first of said vertically extending chambers adjacent the front wall of the switchboard contains electrical control devices, and the second vertically extending chamber contains electric power supply bus bars which are connected to line or incoming terminals of the electrical control devices. A third vertically extending chamber or section contains means for making connection between bus bars connected to the outgoing or load terminals of the electrical control devices and conductors leading to the power consuming loads. The switchboards assembly further includes heat bleeding and dissipating means of the evaporating-recondensing "heat pipe" type, and means for conducting heat from the electrical control devices to the heat dissipating means. The recondensing portion of the heat pipe heat dissipating means is preferably positioned in one of the vertically extending chambers which has means permitting vertical flow of air by natural circulation and radiating fins to increase the transmittal of heat to the air. In a preferred form, thermal conducting connection is made between the electrical control device and the means for transmitting heat to the heat bleeding and dissipating means by a plug-in type connection at the same time that electrical plug-in connection is made between the line and load terminals of the device to the electric power supply bus bars. The invention will be more fully more understood from the following detailed description, and its scope will be pointed out in the appended claims.

DESCRIPTION OF A PREFERRED EMBODIMENT

Figure 1:
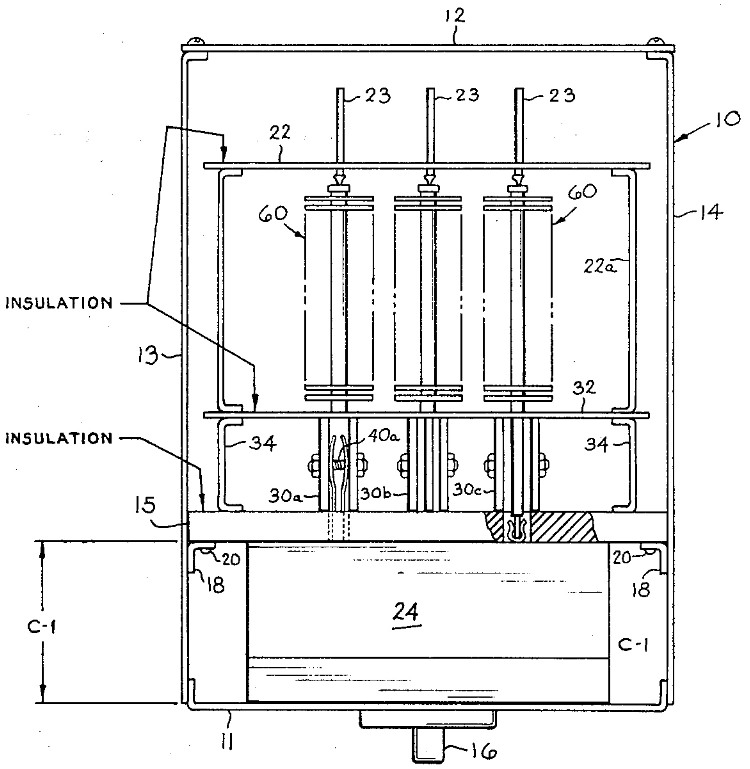
FIG. 1 is a top plan view, in section, of an electric switchboard assembly section or "module" incorporating the invention.
Figure 2:
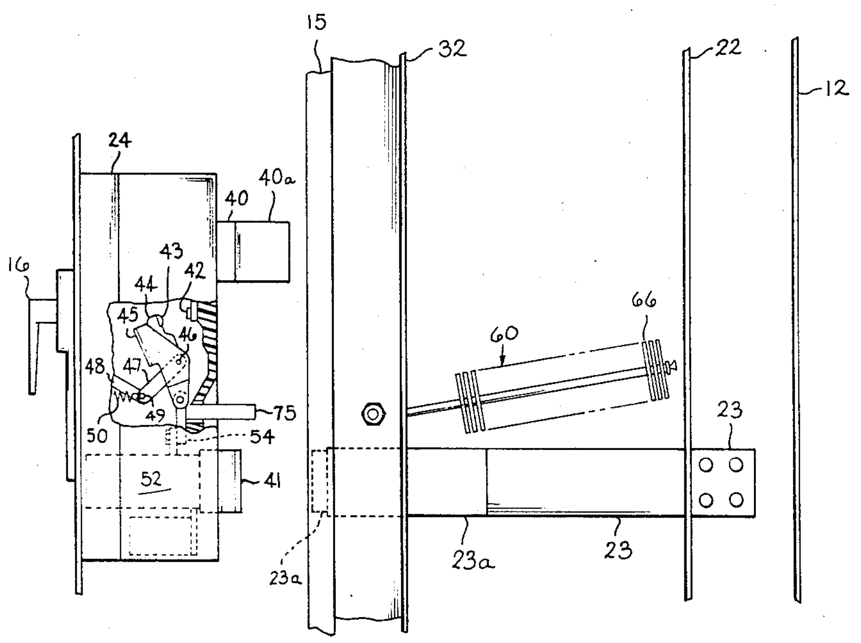
FIG. 2 is a fragmentary side elevational view, in section, of the switchboard section of FIG. 1, taken substantially on a plane indicated by the arrows 2—2 of FIG. 1.

Referring to FIGS. 1 and 2, particularly, the invention is shown as incorporated in an electric switchboard section or module 10 formed of sheet metallic material and having a front wall 11 and a back wall 12, and intervening opposed side walls 13 and 14. The walls of the section 10 are fastened together by any suitable means, such, for example as bolting. The switchboard section 10 also includes an insulation supporting wall 15 extending between the side walls 13 and 14 and fastened to them by suitable means, such as by angle brackets 18 and 19 which may be attached to the sidewalls of suitable means such as by welding, and attached to the insulation wall 15 by suitable means such as by bolts 20. The space between the insulation support wall 15 and the front wall 11 defines a chamber C-1 which is adapted to receive electrical control devices such as the device 24. The device 24 includes rear extending terminals, to be described, and a front operating handle 16 which projects through a corresponding opening, not numbered, in the front wall 11.

Three pairs of power supply bus bars 30A, 30B, and 30C are supported in the switchboard module 10 by suitable means, not shown, with their front edges against the back surface of the insulation supporting wall 15. A second insulation barrier 32 is also supported in the module 10 extending parallel to the insulation wall 15 and spaced therefrom and substantially in contact with the rear edges of the power supply bus bars 30A, 30B, 30C. The insulation barrier 32 may be supported by suitable means, such as by brackets 34 attaching and spacing it from the insulation supporting wall 15. A third insulation barrier 22 is also provided in accordance with the invention for a purpose to be described, in spaced relation and parallel to the insulation supporting wall 32. The insulation barrier 22 is supported in spaced relation to the insulation barrier 32 by suitable means such as by brackets 22A.

A plurality of horizontally extending load-connecting bus bars 23 are also supported in the switchboard section 10 by suitable means. The load connecting bus bars 23 pass between the individual members of the respective pairs 30A, 30B, 30C of power supply bus bars. The portion of the load supply bus bars 23 which passes between the power supply bus bars 30A, 30B, 30C is insulated as indicated at 23A in FIG. 2, by suitable means such as by a thin tough coating of insulation material such as powdered resin applied by the "fluidized bed" coating process.

The electrical control device 24 has three rearwardly extending line connecting terminals 40, and a corresponding set of 3 load connecting terminals 41. The line connecting terminals 40 carry, at their outer end, a resillient pair of contact jaws 40A which are adapted to make electrical contact with the inner surfaces of each corresponding pair of power bus bars 30A, 30B, 30C. The resillient contact jaws 40A are biased apart by suitable means such as by a contact pressure spring 40A, see FIG. 1.

The load connecting terminals 41, each carry a pair of contact jaws which are adapted to contact the opposite outside surfaces of the end 23A of the load connecting strap 23, which is left uninsulated for this purpose.

The electrical control device 24 may therefore be inserted in and removed from the electric switchboard assembly module 10 by simple plug-in action, when the front cover 11 of the switchboard module is removed.

The electric control device 24 may be of any suitable type, such as a molded case electric circuit breaker, an electric switch, or a switch-fuse combination, etc. For purposes of illustration, a molded case electric circuit breaker has been illustrated, containing 3 pairs of separable contacts comprising a stationary contact 42 and a movable contact 43. The movable contact 43 is moved between open and closed circuit positions by the operating handle 16 by means of an operating mechanism which is only partially shown in the drawing of FIG. 2. A more complete disclosure of an operating mechanism for a molded case electric circuit breaker is contained in U.S. Pat. No. 3,343,109 issued 9-19-67 to C.L. Jencks and G.W. Kiesel and assigned to the same assignee as the present invention. As illustrated, the electrical path through the control device 24 (circuit breaker) includes a contact carrier 44 which is carried by a contact arm 45 which is pivotally supported in the casing on a pivot 46, and operated by a pair of interconnected toggle links 47, 48. The knee point or pivotal interconnection 49 of the toggle links 47, 48 is connected by a tension spring 50 to the operating mechanism, so as to provide a quick-make and quick-break operation.

The contact arm 45 is pivotly supported in the casing of the device 24 by suitable means such as by being pivoted on a pivot block 54 which is fixedly mounted against the back wall of the circuit breaker casing.

A more specific description of the pivot block 54 is contained in U.S. Pat. No. 3,365,561 issued Jan. 23, 1968 to C. L. Jencks and G. W. Kiesel assigned to the same assignee as the present invention. The electric circuit control device 24 also includes electric current responsive means indicate generally by the dotted rectangle 52 and comprises time delay means operating within a relatively low range of overcurrents and instantaneous acting magnetic means, operating in a relatively higher range of overcurrents. The electric circuit path through the circuit control device 24 is from the line terminals 40 to the Stationary contact 42, to the movable contacts 43, to the contact arms 45, to the pivot block 54, to the trip unit 52, to the trip unit 52, to the load terminal straps 41, to the load outgoing load bus bar straps 23. Suitable cable or bus bar connecting means, not shown, may of course be provided for connection to the outer end of the load terminal bus bar 23 in order to deliver the electric power to the power consuming device or "load."

In accordance with the invention, for the purpose of removing heat from the electrical control devices 24 and dissipating it in the ambient air of the switchboard assembly, a plurality of "heat pipe" type heat bleeding and dissipating devices 60 are built into and form part of the switchboard assembly. In the illustrated embodiment, three of such heat pipe bleeding and dissipating devices 60 are illustrated, see FIGS. 1 and 2.

The heat bleeding and dissipating devices 60 may be installed in various ways in the switchboard assembly in accordance with the dictates of the particular structure, so long as the principles of the present invention are adhered to. In accordance with these principles, heat is taken by the most direct path possible from the electrical control device, and preferably from the highest temperature point of the electrical control device, transported to a part of the switchboard assembly different from that part containing the electrical control device, and there dissipated by suitable heat dissipating means, such as by fins, to the ambient naturally circulating air. Referring to FIGS. 1 through 4, three heat pipe assemblies 60 are shown, each mounted by supporting blocks 70 at one end portion, the supporting blocks 70 each between corresponding pairs of the power supply bus bar 30A, 30B, 30C.

Figure 5:
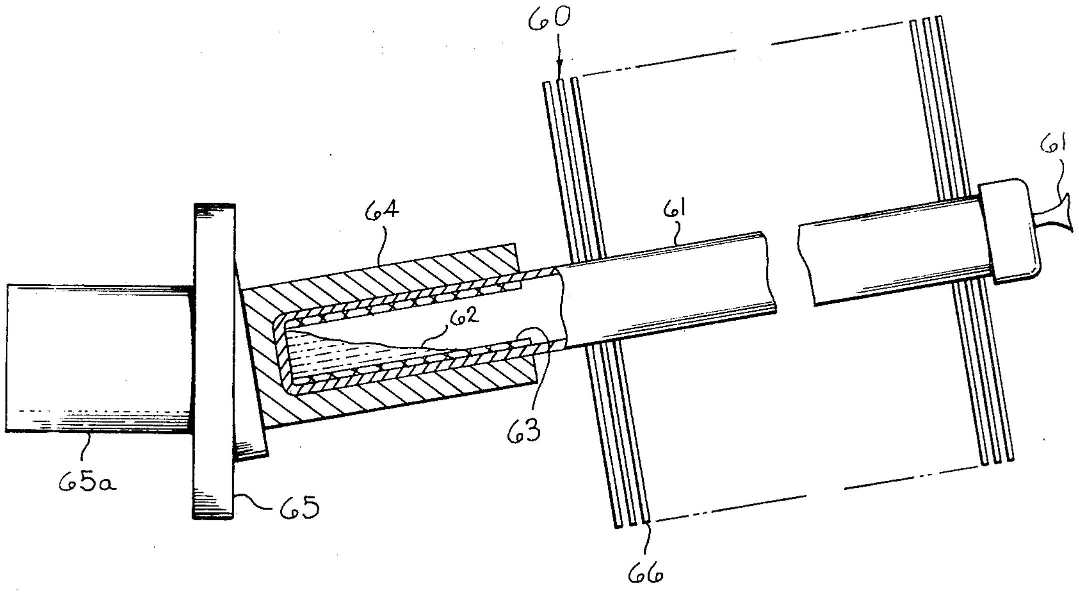
FIG. 5 is a partially sectioned view, on enlarged scale, of a heat pipe assembly used in the invention.

The structure of each heat pipe 60 is as shown in FIG. 5. The heat pipe assembly 60 includes an elongated generally tubular body member 61 which is closed at both ends and includes a sealed inlet tube 61A to facilitate evacuating. The heat pipe assembly 60 further includes a small amount of liquid such as water 62 which normally collects at one end in liquid form and which may be in vapor form in other parts of the assembly when the device is in operation. Also included, is a "wick" member 63 which may be a roll of wire screening such as copper wire mesh. The wick 63 in the embodiment illustrated extends only just beyond the portion in which the water 62 normally collects. The function of the wick 63 is to cause the water 62 to distribute itself around the full inner surface of the tube 61 at this end and thereby to be more readily evaporated by heat applied to this end.

For the purpose of dissipating heat from the tube 61, a plurality of fin members 66 which may be circular or non-circular in shape are provided which are rigidly mounted on the tube 61 by suitable means, such as by soldering or brazing. In the form illustrated, a heat bleeding and distributing or "heat spreader" member 64 of metal is also provided, surrounding one end of the tube member 61. The member 64 is attached to the heat transmitting base 65 by suitable means, such as by brazing. If desirable, the members 64 and 65 may be formed from a single piece of metal.

In operation, the heat pipe works as follows: The heat pipe is mounted so that the right end as viewed is slightly elevated, causing the water 62 to collect in the lower (left) end. Heat is transmitted from the control device pivot block 54 through the post 75 to the base 65 and thence to the member 64. This causes the water 62 to evaporate rapidly due to the low pressure within the tube 61. The water vapor fills the remaining part of the tube 61. When the water vapor contacts other portions of the tube 61, and especially the portions remote from the member 64, it recondenses, giving heat up to the tube 61, which in turn transmits it to the heat dissipating fins 66. The water then runs down to the left hand end of the tube 61 by the action of gravity, and the cycle is repeated. Heat is picked up in relatively large quantities, in proportion to the heat of vaporization of the water, and this heat is given up at the location where the water vapor recondenses. Thus heat is transmitted from the left hand end or pickup point, to the surrounding air, which circulates around the fins 66.

Figure 3:
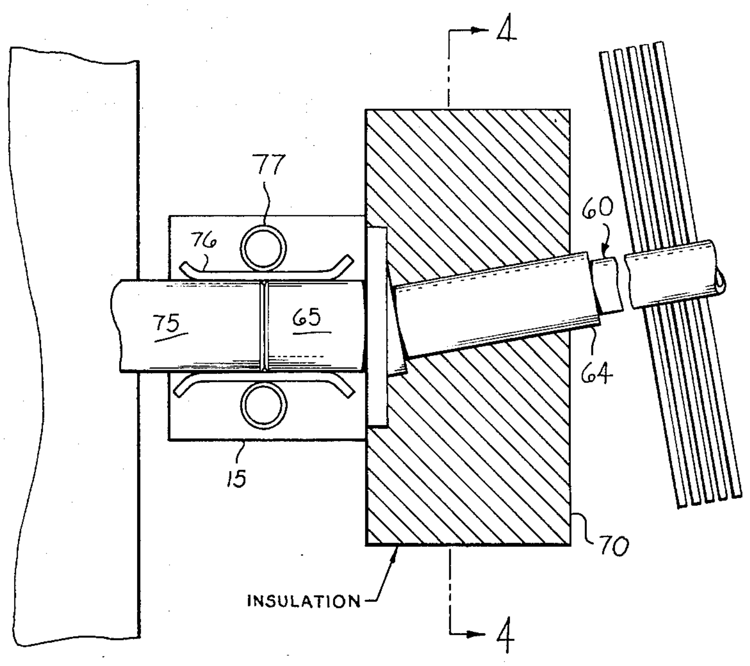
FIG. 3 is a fragmentary view of a portion of the switchboard section of FIGS. 1 and 2, showing particularly the plug-in heat conducting connection between an electrical control device portion and the heat bleeding and dissipating portion of the embodiment of the invention illustrated in FIGS. 1 and 2.
Figure 4:
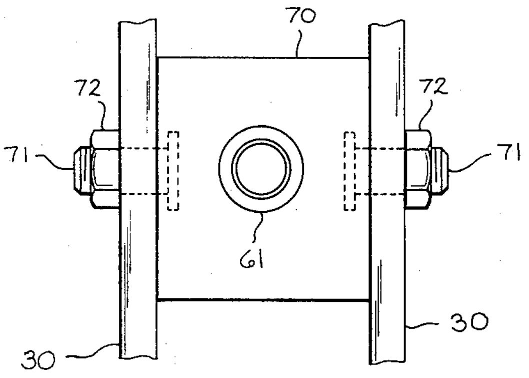
FIG. 4 is a sectional view taken on a plane indicated generally by the arrows 4—4 of FIG. 3.

The specific manner of supporting the heat pipe assembly 60 is illustrated in FIGS. 3 and 4. In accordance with these figures, a block 70, of insulating material is rigidly mounted between two power supply bus bars such as the bus bars 30A, by means of threaded studs 71 (see FIG. 4) which are embedded such as by being molded in the block 70. The block 70 is fixed in position by retaining nuts 72. As shown in FIG. 3, the heat pipe assembly 60 may be mounted in the block 70 by means of a "force fit" of the portion 64 in the hole in the block 70.

For the purpose of making possible the extraction of heat from an intermediate part of the circuit control device 24 as shown, the pivot block 50 is provided with a rearwardly extending conductive post 75. A plug-in type socket is provided which is supported by the supporting plate 15, as shown in FIG. 3. As shown in this figure, the projection 75 from the control device 24 meets and butts against the base 65 which is rigidly attached to the heat bleeder block 64 of the heat pipe assembly 60. Heat transfer between these members is further improved by the segments 76 which bridge the two projecting portions 75 and 65 and are held against them by a garter type coil spring 77.

In operation, heat generated within the circuit control device 24, whether it be at the terminals, at the contacts, or at the pivot point of the contact arms, is extracted from the circuit control device for each pole through the projection 75 which is in heat conducting engagement with a corresponding projection 65 of a corresponding heat pipe 60. The heat is conducted by the heat pipe 60 to the heat dissipating fins 66, which dissipate the heat to the surrounding air.

It will be understood that the switchboard housing 10 is mounted in such a way as to facilitate the vertical air flow through the portion of the switchboard in which the fins 66 are positioned. Thus the bottom of the switchboard section is preferably mounted in spaced relation to the floor by suitable means, such as by mounting it on spaced rails. In addition, ventilating openings are provided in the bottom wall and in the side walls of the housing of the section 10 near the bottom portion, and also in the top wall and in the side walls adjacent the top wall. In this manner, heat is continually being removed from the switchboard in a highly effective manner by conducting heat from the high temperature points in the switchboard, such as the points where the control devices are mounted, to a convenient location where such heat may be dissipated to the air by means of heat dissipating fins, etc.

While the invention has been illustrated in one specific form, it will be readily apparent that many modifications thereof may be made. It is, accordingly, intended by the appended claims to cover all such modifications as fall within the true spirit and scope of this invention. Thus, for example, the heat dissipating fins may be located in the same vertical chamber as the load terminal ends of the load straps 23. This is especially true if, as in the form illustrated in FIGS. 1 and 2, the heat pipe member is always at the same electrical potential as the load strap 23. It will also be understood that if desired, I may electrically insulate the heat pipe member 60 from the electrical conducting parts of the device D-1 and of the bus bars of the switchboard. Thus, for example, a relatively thin sheet of relatively good thermal conducting electrically insulating material, not shown, may be interposed between the heat receiving end of the heat spreader block 64 and the adjacent electrically conductive parts.

I claim:

1. An electric power switchboard assembly comprising:

a. a supporting frame;

b. at least one multi-pole electric power control device removably supported on said supporting frame;

c. a plurality of line and load connecting terminals carried by said control device, there being at least one said line terminal and one said load terminal for each pole of said multi-pole control device;

d. a plurality of incoming and outgoing electrical conductors supported in insulated relation on said supporting frame, there being at least one said incoming conductor and one said outgoing conductor for each pole of said multi-pole control device;

e. connecting means connecting each of said line terminals of said control device to a corresponding one of said incoming conductors and connecting means connecting each of said load terminals of said control device to a corresponding one of said outgoing conductors;

f. at least one elongated heat pipe heat transporting means fixedly supported on said supporting frame;

g. said incoming conductors, said line and load terminals of said control device, said control device, and said outgoing conductors forming a complete electrical circuit without involving said heat pipe heat transporting means;

h. said electric power control device including metallic heat conducting means other than said line and load terminals of said control device disposed and arranged in good heat conducting relation with said heat pipe heat transporting means.

2. An electric power switchboard assembly as set forth in claim 1 wherein said heat conducting means of said control device is maintained in heat conducting relation with said heat pipe by means mounting and connecting said control device in operative position in said switchboard assembly.

3. An electric power switchboard assembly as set forth in claim 1, said power control device including metallic heat conducting means other than said line and load terminals of said control device, said switchboard assembly including plug-in type connecting means retaining said heat conducting means of said control device in good heat conducting relation with said one end of said heat pipe heat transporting means.

4. An electric power switchboard assembly as set forth in claim 3 wherein said metallic heat conducting means of said control device comprises an elongated member projecting from said control device and wherein said plug-in type connecting means for said heat pipe comprises a socket fixedly mounted in said supporting frame and receiving said elongated member in good heat conducting relation.

5. An electric power switchboard assembly as set forth in claim 1 wherein said switchboard assembly includes at least one pair of closely spaced electric bus bar conductors, a switchboard member fixedly mounted between said bar of bus bar conductors, and means supporting said heat pipe heat transporting means on said support member.

6. An electric power switchboard assembly comprising:

a. a supporting frame;

b. at least one multi-pole electric power control device removably supported on said supportng frame;

c. a plurality of line and load connecting terminals carried by said control device, there being at least one said line terminal and one said load terminal for each pole of said multi-pole control device;

d. a plurality of incoming and outgoing electrical conductors supported in insulated relation on said supporting frame, there being at least one said incoming conductor and one said outgoing conductor for each pole of said multi-pole control device;

e. connecting means connecting each of said line terminals of said control device to a corresponding one of said incoming conductors and connecting means connecting each of said load terminals of said control device to a corresponding one of said outgoing conductors;

f. at least one elongated heat pipe heat transporting means fixedly supported on said supporting frame;

g. said incoming conductors, said line and load terminals of said control device, said control device, and said outgoing conductors forming a complete electrical circuit without involving said heat pipe heat transporting means;

h. said electric power control device including metallic heat conducting means other than said line and load terminals of said control device disposed and arranged in good heat conducting relation with said one end of said heat pipe heat transporting means, i. said supporting frame comprises a generally box-shaped enclosure having front, back, top, bottom, and opposed side walls;

j. a first generally plane barrier extending between said side walls parallel to said front and back walls;

k. said control device being mounted in said enclosure in the space between said front wall and said first barrier;

l. said incoming conductors comprising vertically extending bus bars positioned adjacent said first barrier at the side opposite said control device;

m. said heat pipe heat transporting means comprising an elongated member having said one end positioned adjacent said vertically extending bus bars and in a direction generally toward said back wall of said enclosure.

* * * * *